United States Patent
Woo

(10) Patent No.: US 7,286,861 B2
(45) Date of Patent: Oct. 23, 2007

(54) ROTARY FOLDER-TYPE MOBILE COMMUNICATION TERMINAL

(75) Inventor: Seong-taek Woo, Bucheon-Si (KR)

(73) Assignee: Curitel Communications, Inc., Seoul (KR)

( * ) Notice: Subject to any disclaimer, the term of this patent is extended or adjusted under 35 U.S.C. 154(b) by 296 days.

(21) Appl. No.: 10/974,826

(22) Filed: Oct. 28, 2004

(65) Prior Publication Data

US 2005/0130718 A1  Jun. 16, 2005

(30) Foreign Application Priority Data

Dec. 10, 2003 (KR) .................. 10-2003-0089639

(51) Int. Cl.
*H04M 1/00* (2006.01)

(52) U.S. Cl. ............... 455/575.3; 455/575.4; 379/433.13

(58) Field of Classification Search ......... 455/550.1, 455/575.1, 575.3, 575.4; 379/433.13, 433.01, 379/433.11; 361/683, 686; 16/221
See application file for complete search history.

(56) References Cited

U.S. PATENT DOCUMENTS

| | | | | |
|---|---|---|---|---|
| 5,905,796 A * | 5/1999 | Jung | .................. | 379/433.13 |
| 6,876,872 B2 * | 4/2005 | Ko | .............................. | 455/572 |
| 6,950,686 B2 * | 9/2005 | Won | ........................ | 455/575.3 |
| 7,016,183 B2 * | 3/2006 | Takemoto et al. | .......... | 361/683 |
| 2002/0163778 A1 * | 11/2002 | Hazzard et al. | ............ | 361/683 |
| 2004/0097262 A1 * | 5/2004 | Lee | ......................... | 455/556.1 |
| 2004/0198433 A1 * | 10/2004 | Lee | ......................... | 455/556.1 |
| 2004/0198474 A1 * | 10/2004 | Jung et al. | ............... | 455/575.1 |
| 2004/0202314 A1 * | 10/2004 | Lu et al. | ................ | 379/433.01 |
| 2005/0101358 A1 * | 5/2005 | Carpenter | ................ | 455/575.1 |

FOREIGN PATENT DOCUMENTS

JP  2002-176477  6/2002

* cited by examiner

*Primary Examiner*—Edward F. Urban
*Assistant Examiner*—Nhan T. Le
(74) *Attorney, Agent, or Firm*—Oblon, Spivak, McClelland, Maier & Neustadt, P.C.

(57) ABSTRACT

A rotary folder-type mobile communication terminal is provided, including a body part, a folder part, a folding hinge part mounted on a prescribed axis for opening/closing the folder part, and a rotating hinge part mounted on another prescribed axis different from the axis of the folding hinge part while being spaced apart from the holding hinge part for rotating the folder part.

8 Claims, 7 Drawing Sheets

ROTARY FOLDER-TYPE MOBILE COMMUNICATION TERMINAL

BACKGROUND OF THE INVENTION

1. Field of the Invention

The present invention relates to a rotary folder-type mobile communication terminal, and more particularly to a rotary folder-type mobile communication terminal that is capable of providing a large arrangement space sufficient to arrange a camera having a great number of pixels and related camera parts therein.

2. Description of the Related Art

A rotary folder-type mobile communication terminal with a foldable and simultaneously rotatable folder part is known.

FIG. 7 is a partial perspective view, cut away in part, showing a conventional rotary folder-type mobile communication terminal. The construction and operation of the conventional rotary folder-type mobile communication terminal will be described below with reference to FIG. 7.

As shown in FIG. 7, the conventional rotary folder-type mobile communication terminal comprises: a body part 100 having a button-operating unit disposed on the upper surface thereof; a folder part 200 having an LCD window facing the body part 100; a rotating hinge part 300 comprising a hinge 301 and a fixing element 302 for rotatably connecting the body part 100 and the folder part 200; and a folding hinge part 400 for opening/closing the folder part 200.

The folder part 200 is folded to the body part 100 or unfolded from the body part 100 by means of the folding hinge part 400 so that the folder part 200 is closed or opened. The folder part 200 can be rotated by means of the rotating hinge part 300 while the folder part 200 is unfolded open. The rotating hinge part 300 and the folding hinge part 400 are mounted on the same axis.

Since the rotating hinge part 300 and the folding hinge part 400 are mounted on the same axis as described above, however, an arrangement space necessary for arranging a camera is limited to a left-side or right-side space of the folder part where the rotating hinge part is fixed. As a result, the conventional rotary folder-type mobile communication terminal does not provide a large arrangement space sufficient to arrange a large-sized camera having a great number of pixels, for example, several mega-pixels.

Especially in the case of the camera having a great number of pixels, a digital sensor is still used since no camera sensor for mobile communication terminals has yet been developed. The digital sensor is of a large size. Consequently, when the digital sensor is applied to the conventional rotary folder-type mobile communication terminal, it is very difficult to provide an arrangement space necessary for arranging the digital sensor and other parts of the camera inside the left-side or right-side space of the upper end of the folder part where the rotating hinge part is fixed. As a result, the thickness of the folder part is inevitably increased.

SUMMARY OF THE INVENTION

It is an object of the present invention to provide a rotary folder-type mobile communication terminal that is capable of providing a large arrangement space sufficient to arrange large-sized parts for a camera without increasing the thickness of a folder part of the rotary folder-type mobile communication terminal as compared to the conventional rotary folder-type mobile communication terminal.

It is another object of the present invention to provide a rotary folder-type mobile communication terminal having a simple folder-holding structure for securely holding the folder part after the folder part is rotated.

In accordance with the present invention, the above and other objects can be accomplished by the provision of a rotary folder-type mobile communication terminal, comprising: a body part; a folder part; a folding hinge part mounted on a prescribed axis for opening/closing the folder part; and a rotating hinge part mounted on another prescribed axis different from the axis of the folding hinge part while being spaced apart from the folding hinge part for rotating the folder part.

The body part has a button-operating unit disposed on the upper surface thereof, and the folder part has an LCD window facing the body part.

Preferably, the rotating hinge part comprises a hinge and a fixing element.

The rotary folder-type mobile communication terminal further comprises: an auxiliary connection part disposed between the body part and the folder part for connecting the folding hinge part and the rotating hinge part to each other.

Preferably, the auxiliary connection part is provided with a cutout groove.

Preferably, the body part is provided at the upper surface thereof with a space part, and the space part is defined inside the cutout groove.

The rotary folder-type mobile communication terminal further comprises: a protrusion part disposed on the space part.

Preferably, the upper end of the auxiliary connection part is connected to the protrusion part by means of the folding hinge part.

Preferably, the hinge of the rotating hinge part is mounted in the folder part, and the fixing element of the rotating hinge part is mounted in the auxiliary connection part.

The rotary folder-type mobile communication terminal further comprises: a fixing element-locating member disposed at the auxiliary connection part for securely locating the fixing element of the rotating hinge part; and a hinge-locating member disposed at the folder part for securely locating the hinge of the rotating hinge part.

Preferably, the fixing element-locating member has an insertion groove for allowing the fixing element of the rotating hinge part to be fixedly inserted therethrough, and the hinge-locating member has an insertion tube for allowing the hinge of the rotating hinge part to be fixedly inserted therethrough.

Preferably, the fixing element-locating member is provided at both sides thereof with engagement grooves, and the engagement grooves are arranged symmetrically to each other. The hinge-locating member is provided at one side thereof with an engagement projection, and the engagement projection is engaged into one of the engagement grooves to prevent further rotation of the folder part after the folder part is rotated by prescribed degrees.

Preferably, the fixing element-locating member has projection parts formed at the rear of the engagement grooves such that the projection parts surround the engagement grooves, respectively.

Preferably, the fixing element-locating member is provided at both ends thereof with fixing parts, respectively, and the hinge-locating member is provided at both ends thereof with fixing parts, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
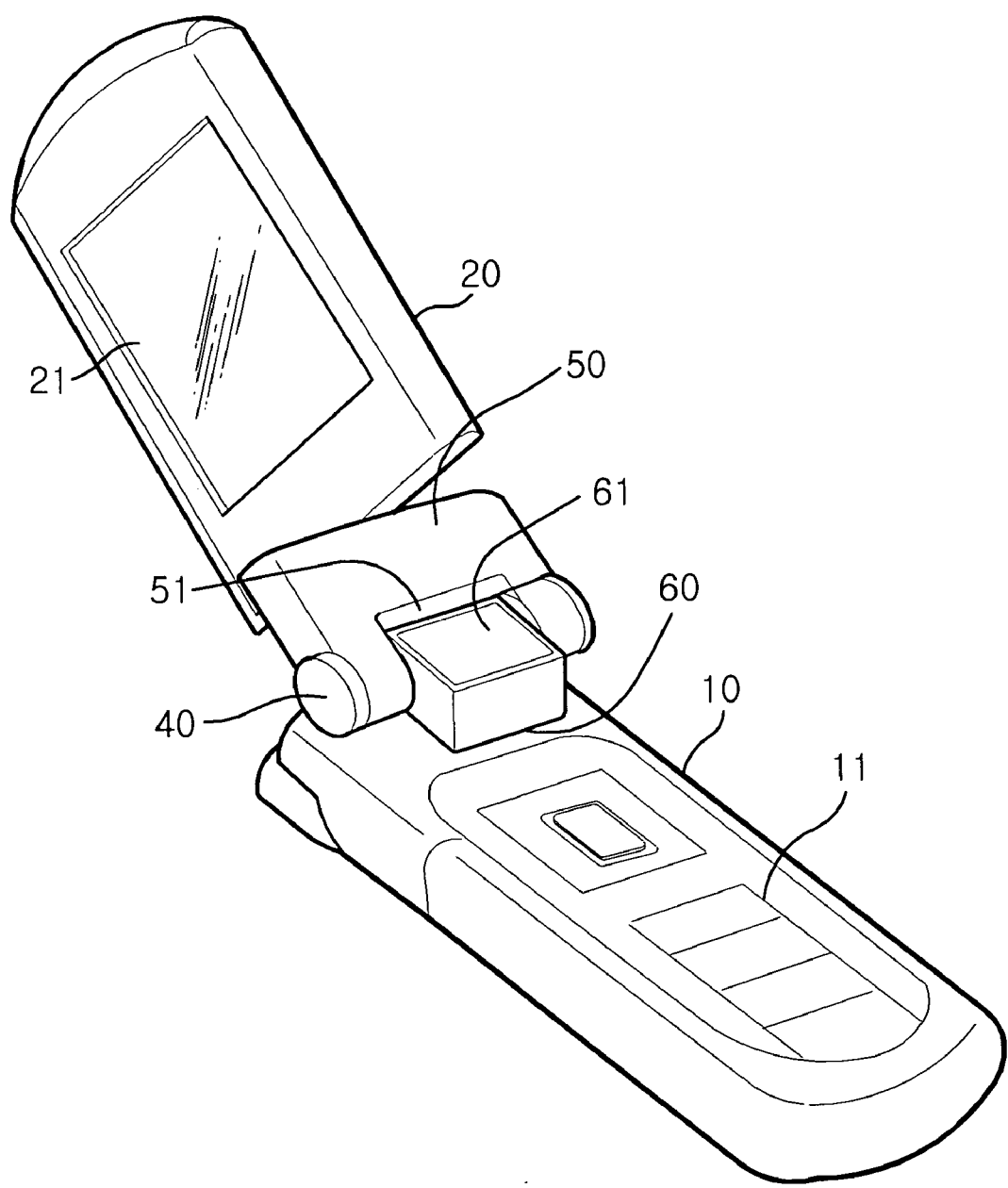
FIG. 1 is a perspective view showing a rotary folder-type mobile communication terminal according to a preferred embodiment of the present invention with a folder part of the rotary folder-type mobile communication terminal unfolded open.
Figure 2:
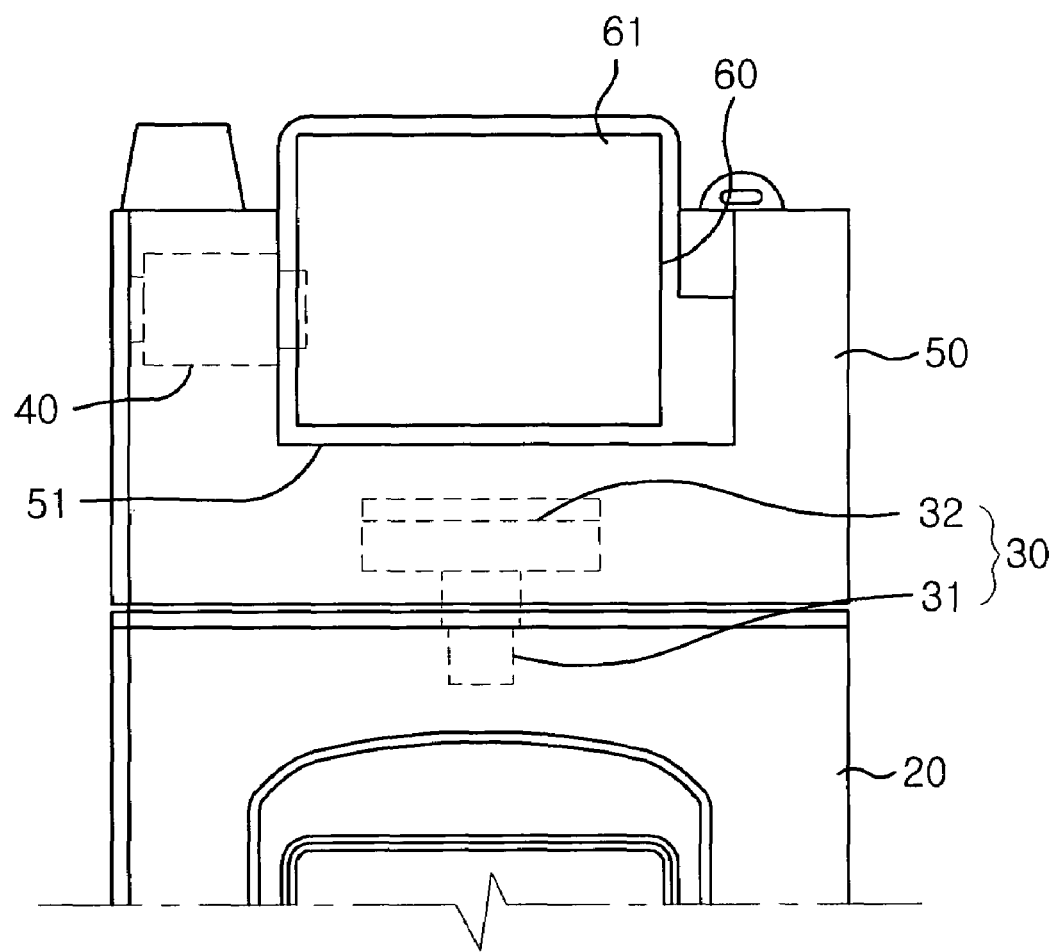
FIG. 2 is a front view, in part, showing the rotary folder-type mobile communication terminal according to the preferred embodiment of the present invention with the folder part of the rotary folder-type mobile communication terminal folded closed.

FIG. 1 is a perspective view showing a rotary folder-type mobile communication terminal according to a preferred embodiment of the present invention with a folder part of the rotary folder-type mobile communication terminal unfolded open, and FIG. 2 is a front view, in part, showing the rotary folder-type mobile communication terminal according to the preferred embodiment of the present invention with the folder part of the rotary folder-type mobile communication terminal folded closed.

The construction of the rotary folder-type mobile communication terminal according to the preferred embodiment of the present invention will now be described in detail with reference to FIGS. 1 and 2.

The rotary folder-type mobile communication terminal of the present invention comprises: a body part 10 having a button-operating unit 11 disposed on the upper surface thereof; a folder part 20 having an LCD window 21 facing the body part 10; a rotating hinge part 30 comprising a hinge 31 and a fixing element 32 for rotatably connecting the body part 10 and the folder part 20; and a folding hinge part 40 for opening/closing the folder part 20.

Between the body part 10 and the folder part 20 is disposed an auxiliary connection part 50. The rotating hinge part 30 is mounted to the folder part 20 and the auxiliary connection part 50. The folding hinge part 40 is mounted to the auxiliary connection part 50 while the folding hinge part 40 is spaced apart from the rotating hinge part 30. Specifically, the rotating hinge part 30 is mounted on a prescribed axis formed at the folder part 20 and the auxiliary connection part 50, and the folding hinge part 40 is mounted on another prescribed axis formed at the auxiliary connection part 50, which is different from the axis of the rotating hinge part 30.

At the upper end of the auxiliary connection part 50 adjacent to the folding hinge part 40 is formed a cutout groove 51 such that the cutout groove 51 extends in the lateral direction of the auxiliary connection part 50 from one end of the folding hinge part 40. On the upper surface of the body part 10 inside the cutout groove 51 is formed a space part 60, on which is disposed a protrusion part 61.

The upper end of the auxiliary connection part 50 is connected to the protrusion part 61 by means of the folding hinge part 40. The hinge 31 is mounted in the folder part 20, and the fixing element 32 is mounted in the auxiliary connection part 50.

The rotating hinge part 30 is spaced apart from the folding hinge part 40 so that the space part 60 necessary for arranging large-sized parts, such as a camera having a great number of pixels, is sufficiently obtained.

The folding hinge part 40 connects the auxiliary connection part 50 to the body part 1 while the folding hinge part 40 is spaced apart from the rotating hinge part 20. The folder part 20 is folded or unfolded by means of the folding hinge part 40 so that the folder part 20 is closed or opened.

The cutout groove 51 is formed at the auxiliary connection part 50 such that the space part 60 is provided on the upper surface of the body part 10.

The protrusion part 61 is disposed on the space part 60 of the body part 10 such that the protrusion part 61 is protruded upward in the cutout groove 51. Consequently, a large arrangement space sufficient to arrange a camera having a great number of pixels is obtained.

Also, the fixing element 32 is mounted in the auxiliary connection part 50, and the hinge 31, which is preferably integrally formed with the fixing element 32, is mounted in the folder part 20. Consequently, a large arrangement space sufficient to arrange a camera having a great number of pixels is obtained through the provision of the space part 60, and thus the camera can be mounted in the rotary folder-type mobile communication terminal of the present invention without increasing the size and the thickness of the folder part 20.

In other words, a large-sized camera can be easily mounted in the rotary folder-type mobile communication terminal through the provision of the space part 60, and the dimensional change of the folder can be minimized through the provision of the auxiliary connection part 50 so that the fixing element 32 is mounted in the auxiliary connection part 50 and the hinge 31 is mounted in the folder part 20.

According to the present invention as described above, the folding hinge part 40 and the rotating hinge part 30 are mounted on different axes while the folding hinge part 40 and the rotating hinge part 30 are spaced apart from each other so that the space part 60 is provided, whereby the dimensional change of the folder is minimized.

Figure 3:
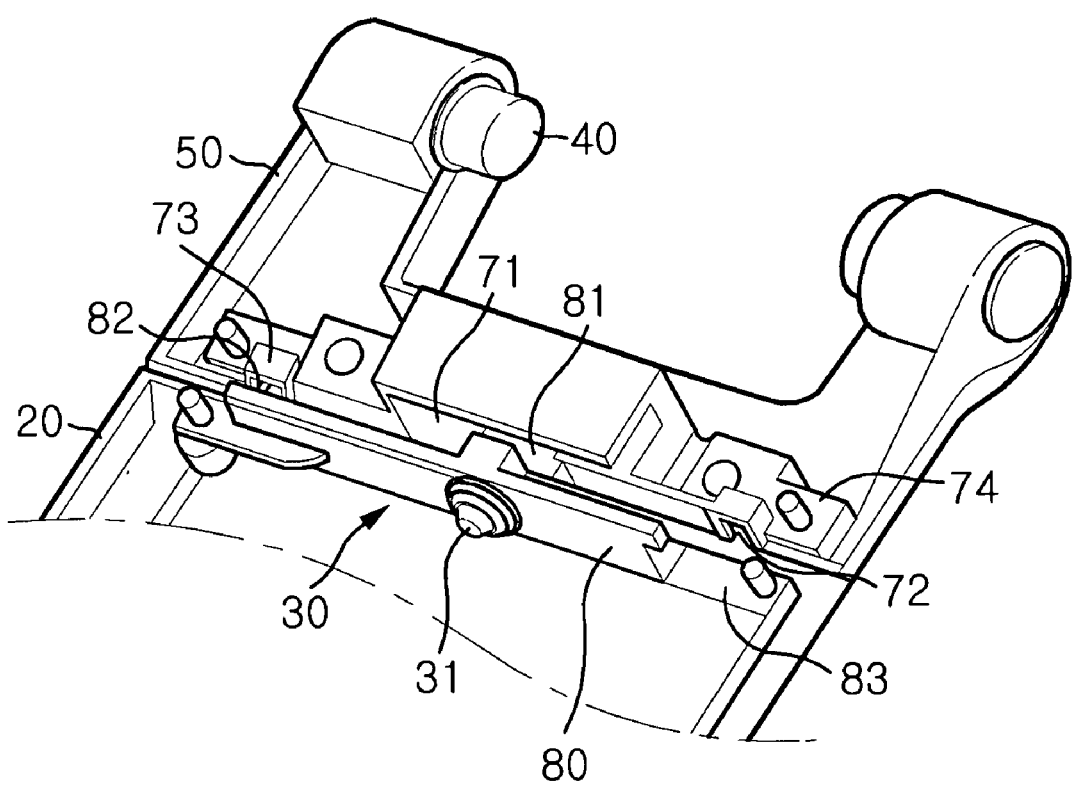
FIG. 3 is a perspective view, in part, of the rotary folder-type mobile communication terminal according to the preferred embodiment of the present invention showing the connection of essential components of the rotary folder-type mobile communication terminal.
Figure 4:
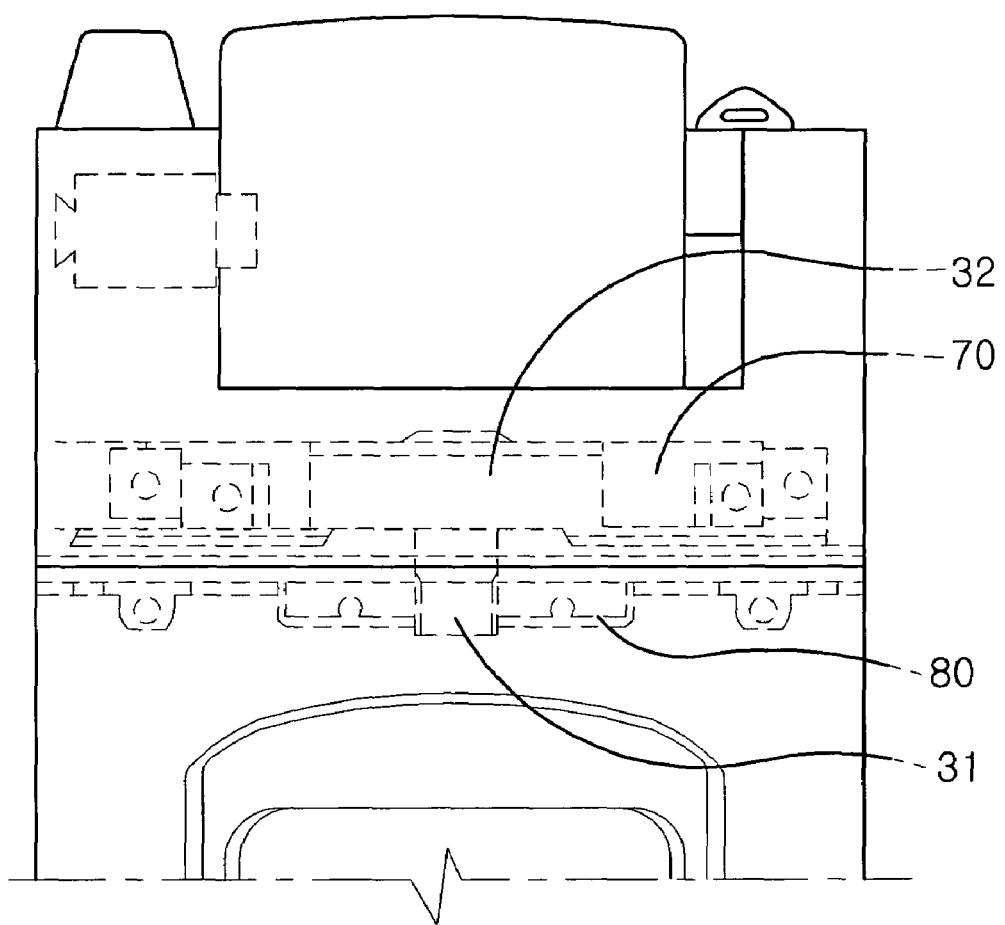
FIG. 4 is a front view, in part, schematically showing the rotary folder-type mobile communication terminal shown in FIG. 3.

FIG. 3 is a perspective view, in part, of the rotary folder-type mobile communication terminal according to the preferred embodiment of the present invention showing the connection of essential components of the rotary folder-type mobile communication terminal, and FIG. 4 is a front view, in part, schematically showing the rotary folder-type mobile communication terminal shown in FIG. 3.

The construction of the rotary folder-type mobile communication terminal according to the preferred embodiment of the present invention will now be described in detail with reference to FIGS. 3 and 4.

At the folder part 20 is disposed a hinge-locating member 80 for securely locating the hinge 31 of the rotating hinge part 30, and at the auxiliary connection part 50 is disposed a fixing element-locating member 70 for securely locating the fixing element 32 of the rotating hinge part 30.

Specifically, the fixing element-locating member 70 has an insertion groove 71 formed at the center thereof. The fixing element 32 of the rotating hinge part 30 is inserted in the insertion groove 71 of the fixing element-locating member 70. At both sides of the insertion groove 71 are formed engagement grooves 72 while the engagement grooves 72 are arranged symmetrically to each other. At the rear of the engagement grooves 72 are formed projection parts 73, respectively. Specifically, the projection parts 73 surround the engagement grooves 72, respectively. The fixing element-locating member 70 is provided at both ends thereof with fixing parts 74, respectively.

The hinge-locating member 80 has an insertion tube 81 formed at the center thereof. The hinge 31 of the rotating hinge part 30 is fixedly inserted in the insertion tube 81 of the hinge-locating member 80. At one side of the insertion tube 81 is formed an engagement projection 82. The hinge-locating member 80 is provided at both ends thereof with fixing parts 83, respectively.

The fixing element-locating member 70 is mounted in the auxiliary connection part 50 while the fixing element 32 is inserted in the insertion groove 71. The hinge-locating member 80 is mounted in the folder part 20 while the hinge 31 is inserted in the insertion tube 81.

When the folder part 20 is rotated about the rotating hinge part 30 by 180 degrees, the engagement projection 82 of the hinge-locating member 80 mounted in the folder part 20 is engaged into one of the engagement grooves 72 of the fixing element-locating member 70 mounted in the auxiliary connection part 50. When the folder part 20 is further rotated about the rotating hinge part 30 by 180 degrees, the engagement projection 82 of the hinge-locating member 80 mounted in the folder part 20 is engaged into the other of the engagement grooves 72 of the fixing element-locating member 70 mounted in the auxiliary connection part 50. In this way, the folder part 20 is securely engaged with the auxiliary connection part 50.

While the engagement projection 82 of the hinge-locating member 80 is engaged in the corresponding engagement groove 72 of the fixing element-locating member 70, the engagement projection 82 is securely held by means of the projection parts 73 of the fixing element-locating member 70.

The fixing element-locating member 70 is securely fixed to the auxiliary connection part 50 by means of the fixing parts 74. Similarly, the hinge-locating member 80 is securely fixed to the folder part 20 by means of the fixing parts 83.

Figure 5:
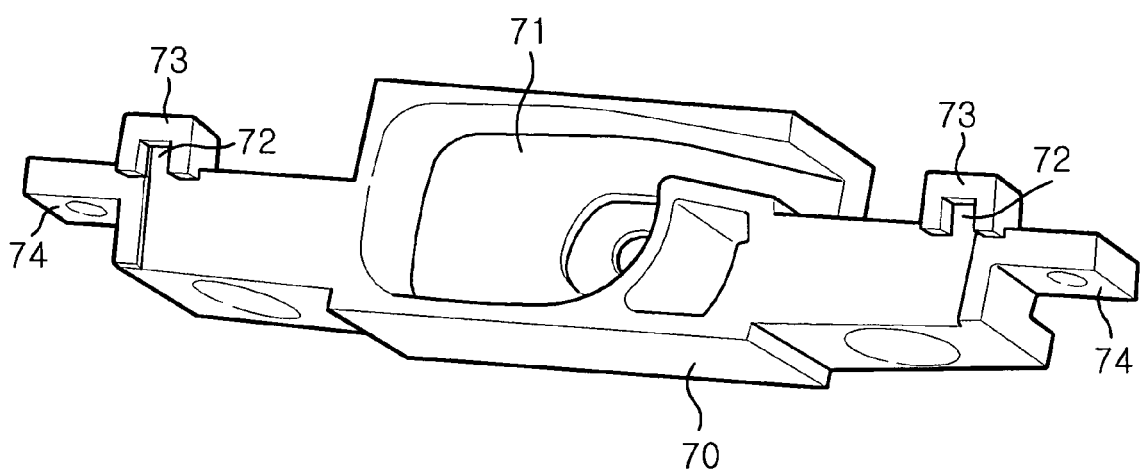
FIG. 5 is a perspective view showing a fixing element-locating member of the rotary folder-type mobile communication terminal shown in FIG. 3.
Figure 6:
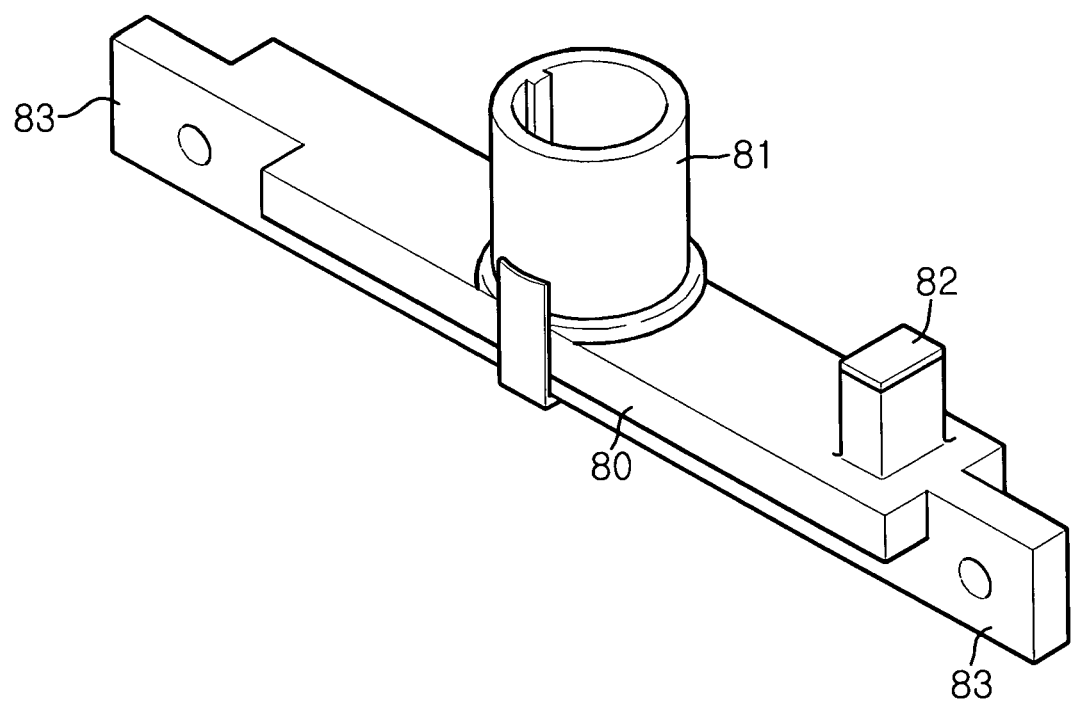
FIG. 6 is a perspective view showing a hinge-locating member of the rotary folder-type mobile communication terminal shown in FIG. 3.
Figure 7:
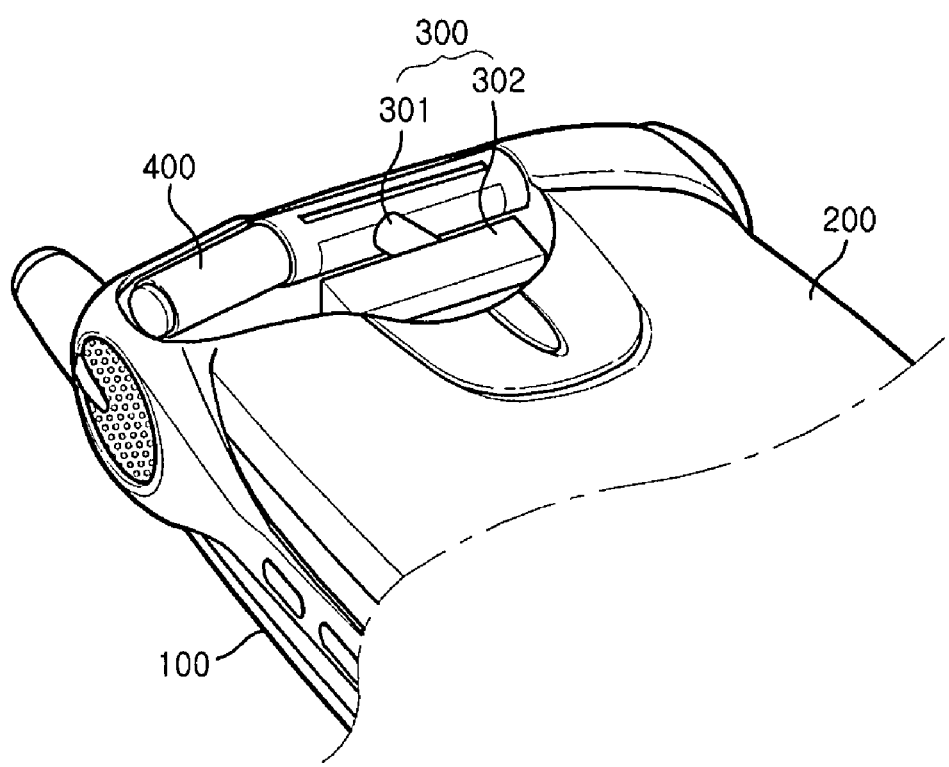
FIG. 7 is a partial perspective view, cut away in part, showing a conventional rotary folder-type mobile communication terminal.

FIG. 5 is a perspective view showing a fixing element-locating member of the rotary folder-type mobile communication terminal shown in FIG. 3, and FIG. 6 is a perspective view showing a hinge-locating member of the rotary folder-type mobile communication terminal shown in FIG. 3.

The operation of the rotary folder-type mobile communication terminal according to the preferred embodiment of the present invention will now be described in detail with reference to FIGS. 5 and 6.

The fixing element-locating member 70 and the hinge-locating member 80 are disposed in such a manner that the fixing element-locating member 70 and the hinge-locating member 80 contact each other while the engagement projection 82 of the hinge-locating member 80 is engaged in one of the engagement grooves 72 of the fixing element-locating member 70. When the folder part 20 is rotated about the rotating hinge part 30 by 180 degrees, the engagement projection 82 of the hinge-locating member 80 is engaged into the other engagement grooves 72 of the fixing element-locating member 70 so that the folder part 20 is securely engaged with the auxiliary connection part 50.

Specifically, when the engagement projection 82 of the hinge-locating member 80 is rotated 180 degrees about the insertion tube 81 while the engagement projection 82 of the hinge-locating member 80 is engaged in one of the engagement grooves 72 of the fixing element-locating member 70, the engagement projection 82 of the hinge-locating member 80 is engaged into the other engagement groove 72 of the fixing element-locating member 70. Consequently, further rotation of folder part 20 is prevented.

The fixing element 32 of the rotating hinge part 30 is securely inserted in the insertion groove 71 of the fixing element-locating member 70. The hinge 31 of the rotating hinge part 30 is securely inserted in the insertion tube 81 of the hinge-locating member 80, which faces the insertion groove 71 of the fixing element-locating member 70.

When the engagement projection 82 of the hinge-locating member 80 is engaged into the corresponding engagement groove 72 of the fixing element-locating member 70, the engagement projection 82 contacts the projection parts 73 of the fixing element-locating member 70. As a result, the engagement projection 82 of the hinge-locating member 80 is securely held by means of the projection parts 73 of the fixing element-locating member 70.

Consequently, whenever the folder part 20 is rotated 180 degrees clockwise or counterclockwise relative to the auxiliary connection part 50, the engagement projection 82 of the hinge-locating member 80 is engaged into the corresponding engagement groove 72 of the fixing element-locating member 70, whereby further rotation of the folder part 20 is prevented, and thus the folder part 20 is securely engaged with the auxiliary connection part 50.

As apparent from the above description, the present invention provides a rotary folder-type mobile communication terminal that is capable of providing a large arrangement space sufficient to arrange a large-sized component, such as a large-sized camera having a great number of pixels, and related parts therein. Consequently, the present invention has the effect of mounting the large-sized component in the rotary folder-type mobile communication terminal without increasing the thickness or the size of a folder part of the rotary folder-type mobile communication terminal as compared to the conventional rotary folder-type mobile communication terminal.

Furthermore, the rotary folder-type mobile communication terminal according to the present invention has a simple folder-holding structure for stably and securely holding the folder part after the folder part is rotated. Consequently, production costs of the rotary folder-type mobile communication terminal are reduced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal which comprises:
   a body part is provided at the upper surface thereof with a space part;
   a folder part having an LCD window facing the body part;
   a folding hinge part mounted on a prescribed axis for opening/closing the folder part;
   a rotating hinge part mounted on another prescribed axis different from the axis of the folding hinge part while being spaced apart from the folding hinge part for rotating the folder part;
   an auxiliary connection part disposed between the body part and the folder part for connecting the folding hinge part and the rotating hinge part to each other, wherein the auxiliary connection part is provided with a cutout groove and the space part being defined inside the cutout groove; and
   a protrusion part disposed on the space part.

2. The mobile communication terminal as set forth in claim 1, wherein the upper end of the auxiliary connection part is connected to the protrusion part by means of the folding hinge part.

3. The mobile communication terminal as set forth in claim 1 or 2, wherein
   the hinge of the rotating hinge part is mounted in the folder part, and
   the fixing element of the rotating hinge part is mounted in the auxiliary connection part.

4. The mobile communication terminal as set forth in claim 3, further comprising:
   a fixing element-locating member disposed at the auxiliary connection part for securely locating the fixing element of the rotating hinge part; and
   a hinge-locating member disposed at the folder part for securely locating the hinge of the rotating hinge part.

5. The mobile communication terminal as set forth in claim 4, wherein
   the fixing element-locating member has an insertion groove for allowing the fixing element of the rotating hinge part to be fixedly inserted therethrough, and
   the hinge-locating member has an insertion tube for allowing the hinge of the rotating hinge part to be fixedly inserted therethrough.

6. The mobile communication terminal as set forth in claim 5, wherein
   the fixing element-locating member is provided at both sides thereof with engagement grooves, the engagement grooves being arranged symmetrically to each other, and
   the hinge-locating member is provided at one side thereof with an engagement projection, the engagement projection being engaged into one of the engagement grooves to prevent further rotation of the folder part after the folder part is rotated by prescribed degrees.

7. The mobile communication terminal as set forth in claim 6, wherein the fixing element-locating member has projection parts formed at the rear of the engagement grooves such that the projection parts surround the engagement grooves, respectively.

8. The mobile communication terminal as set forth in claim 4, wherein
   the fixing element-locating member is provided at both ends thereof with fixing parts, respectively, and the hinge-locating member is provided at both ends thereof with fixing parts, respectively.

* * * * *